United States Patent
Bertero et al.

(10) Patent No.: US 10,115,428 B1
(45) Date of Patent: Oct. 30, 2018

(54) HAMR MEDIA STRUCTURE HAVING AN ANISOTROPIC THERMAL BARRIER LAYER

(71) Applicant: WD Media, Inc., San Jose, CA (US)

(72) Inventors: Gerardo A. Bertero, Redwood City, CA (US); Fenghua Zong, San Jose, CA (US)

(73) Assignee: WD MEDIA, INC., San Jose, CA (US)

( * ) Notice: Subject to any disclaimer, the term of this patent is extended or adjusted under 35 U.S.C. 154(b) by 271 days.

(21) Appl. No.: 13/769,232

(22) Filed: Feb. 15, 2013

(51) Int. Cl.
G11B 5/66 (2006.01)
G11B 11/105 (2006.01)

(52) U.S. Cl.
CPC .............................. G11B 11/10582 (2013.01)

(58) Field of Classification Search
CPC ... G11B 2005/0021; G11B 5/65; G11B 5/645; G11B 5/66; G11B 5/855; G11B 5/40; G11B 5/62; G11B 5/64; G11B 5/653; G11B 5/7013; G11B 5/72; G11B 5/732; G11B 5/7325; G11B 5/8404
See application file for complete search history.

(56) References Cited

U.S. PATENT DOCUMENTS

| | | | |
|---|---|---|---|
| 5,846,648 A * | 12/1998 | Chen et al. | 428/332 |
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |

(Continued)

FOREIGN PATENT DOCUMENTS

JP 2011-060344 3/2011

OTHER PUBLICATIONS

Chen, J.S., J.F. Hu, B.C. Lim, W.L. Phyoe, B. Liu and G. Ju, "Structure and Magnetic Properties of L1(0) FePt film with Ag Heat Sink Layer," Journal of Applied Physics 105, 07B724, American Institute of Physics, published Mar. 18, 2009.

(Continued)

Primary Examiner — Holly C Rickman
Assistant Examiner — Linda N Chau
(74) Attorney, Agent, or Firm — Foley & Lardner LLP (57) ABSTRACT

A heat assisted magnetic recording (HAMR) media structure is disclosed. The HAMR media structure includes a magnetic recording layer comprising an array of magnetic grains for storing information; a heat sink layer disposed below the magnetic recording layer and having a first thermal conductivity; and an anisotropic thermal barrier layer disposed between the magnetic recording layer and the heat sink layer and having a vertical thermal conductivity and an in-plane thermal conductivity, wherein the vertical thermal conductivity is substantially higher than the in-plane thermal conductivity.

12 Claims, 5 Drawing Sheets

(56) References Cited

U.S. PATENT DOCUMENTS

| | | | |
|---|---|---|---|
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |
| 6,303,217 B1 | 10/2001 | Malhotra et al. | |
| 6,309,765 B1 | 10/2001 | Suekane et al. | |
| 6,358,636 B1 | 3/2002 | Yang et al. | |
| 6,362,452 B1 | 3/2002 | Suzuki et al. | |
| 6,363,599 B1 | 4/2002 | Bajorek | |
| 6,365,012 B1 | 4/2002 | Sato et al. | |
| 6,381,090 B1 | 4/2002 | Suzuki et al. | |
| 6,381,092 B1 | 4/2002 | Suzuki | |
| 6,387,483 B1 | 5/2002 | Hokkyo et al. | |
| 6,391,213 B1 | 5/2002 | Homola | |
| 6,395,349 B1 | 5/2002 | Salamon | |
| 6,403,919 B1 | 6/2002 | Salamon | |
| 6,408,677 B1 | 6/2002 | Suzuki | |
| 6,426,157 B1 | 7/2002 | Hokkyo et al. | |
| 6,428,906 B1 | 8/2002 | Wong et al. | |
| 6,429,984 B1 | 8/2002 | Alex | |
| 6,482,330 B1 | 11/2002 | Bajorek | |
| 6,482,505 B1 | 11/2002 | Bertero et al. | |
| 6,500,567 B1 | 12/2002 | Bertero et al. | |
| 6,528,124 B1 | 3/2003 | Nguyen | |
| 6,548,821 B1 | 4/2003 | Treves et al. | |
| 6,552,871 B2 | 4/2003 | Suzuki et al. | |
| 6,565,719 B1 | 5/2003 | Lairson et al. | |
| 6,566,674 B1 | 5/2003 | Treves et al. | |
| 6,571,806 B2 | 6/2003 | Rosano et al. | |
| 6,579,590 B2 | 6/2003 | Ju et al. | |
| 6,628,466 B2 | 9/2003 | Alex | |
| 6,664,503 B1 | 12/2003 | Hsieh et al. | |
| 6,670,055 B2 | 12/2003 | Tomiyasu et al. | |
| 6,682,807 B2 | 1/2004 | Lairson et al. | |
| 6,683,754 B2 | 1/2004 | Suzuki et al. | |
| 6,730,420 B1 | 5/2004 | Bertero et al. | |
| 6,743,528 B2 | 6/2004 | Suekane et al. | |
| 6,759,138 B2 | 7/2004 | Tomiyasu et al. | |
| 6,778,353 B1 | 8/2004 | Harper | |
| 6,795,274 B1 | 9/2004 | Hsieh et al. | |
| 6,855,232 B2 | 2/2005 | Jairson et al. | |
| 6,857,937 B2 | 2/2005 | Bajorek | |
| 6,893,748 B2 | 5/2005 | Bertero et al. | |
| 6,899,959 B2 | 5/2005 | Bertero et al. | |
| 6,916,558 B2 | 7/2005 | Umezawa et al. | |
| 6,939,120 B1 | 9/2005 | Harper | |
| 6,946,191 B2 | 9/2005 | Morikawa et al. | |
| 6,967,798 B2 | 11/2005 | Homola et al. | |
| 6,972,135 B2 | 12/2005 | Homola | |
| 7,004,827 B1 | 2/2006 | Suzuki et al. | |
| 7,006,323 B1 | 2/2006 | Suzuki | |
| 7,016,154 B2 | 3/2006 | Nishihira | |
| 7,019,924 B2 | 3/2006 | McNeil et al. | |
| 7,045,215 B2 | 5/2006 | Shimokawa | |
| 7,070,870 B2 | 7/2006 | Bertero et al. | |
| 7,090,934 B2 | 8/2006 | Hokkyo et al. | |
| 7,099,112 B1 | 8/2006 | Harper | |
| 7,105,241 B2 | 9/2006 | Shimokawa et al. | |
| 7,119,990 B2 | 10/2006 | Bajorek et al. | |
| 7,147,790 B2 | 12/2006 | Wachenschwanz et al. | |
| 7,161,753 B2 | 1/2007 | Wachenschwanz et al. | |
| 7,166,319 B2 | 1/2007 | Ishiyama | |
| 7,166,374 B2 | 1/2007 | Suekane et al. | |
| 7,169,487 B2 | 1/2007 | Kawai et al. | |
| 7,174,775 B2 | 2/2007 | Ishiyama | |
| 7,179,549 B2 | 2/2007 | Malhotra et al. | |
| 7,184,139 B2 | 2/2007 | Treves et al. | |
| 7,196,860 B2 | 3/2007 | Alex | |
| 7,199,977 B2 | 4/2007 | Suzuki et al. | |
| 7,208,236 B2 | 4/2007 | Morikawa et al. | |
| 7,220,500 B1 | 5/2007 | Tomiyasu et al. | |
| 7,229,266 B2 | 6/2007 | Harper | |
| 7,239,970 B2 | 7/2007 | Treves et al. | |
| 7,252,897 B2 | 8/2007 | Shimokawa et al. | |
| 7,277,254 B2 | 10/2007 | Shimokawa et al. | |
| 7,281,920 B2 | 10/2007 | Homola et al. | |
| 7,292,329 B2 | 11/2007 | Treves et al. | |
| 7,294,419 B2 | 11/2007 | Shin et al. | |
| 7,301,726 B1 | 11/2007 | Suzuki | |
| 7,302,148 B2 | 11/2007 | Treves et al. | |
| 7,305,119 B2 | 12/2007 | Treves et al. | |
| 7,314,404 B2 | 1/2008 | Singh et al. | |
| 7,320,584 B1 | 1/2008 | Harper et al. | |
| 7,329,114 B2 | 2/2008 | Harper et al. | |
| 7,375,362 B2 | 5/2008 | Treves et al. | |
| 7,420,886 B2 | 9/2008 | Tomiyasu et al. | |
| 7,425,719 B2 | 9/2008 | Treves et al. | |
| 7,471,484 B2 | 12/2008 | Wachenschwanz et al. | |
| 7,498,062 B2 | 3/2009 | Calcaterra et al. | |
| 7,531,485 B2 | 5/2009 | Hara et al. | |
| 7,537,846 B2 | 5/2009 | Ishiyama et al. | |
| 7,549,209 B2 | 6/2009 | Wachenschwanz et al. | |
| 7,569,490 B2 | 8/2009 | Staud | |
| 7,597,792 B2 | 10/2009 | Homola et al. | |
| 7,597,973 B2 | 10/2009 | Ishiyama | |
| 7,608,193 B2 | 10/2009 | Wachenschwanz et al. | |
| 7,632,087 B2 | 12/2009 | Homola | |
| 7,656,615 B2 | 2/2010 | Wachenschwanz et al. | |
| 7,678,476 B2 | 3/2010 | Weller et al. | |
| 7,682,546 B2 | 3/2010 | Harper | |
| 7,684,152 B2 | 3/2010 | Suzuki et al. | |
| 7,686,606 B2 | 3/2010 | Harper et al. | |
| 7,686,991 B2 | 3/2010 | Harper | |
| 7,695,833 B2 | 4/2010 | Ishiyama | |
| 7,722,968 B2 | 5/2010 | Ishiyama | |
| 7,733,605 B2 | 6/2010 | Suzuki et al. | |
| 7,736,768 B2 | 6/2010 | Ishiyama | |
| 7,755,861 B1 | 7/2010 | Li et al. | |
| 7,758,732 B1 | 7/2010 | Calcaterra et al. | |
| 7,833,639 B2 | 11/2010 | Sonobe et al. | |
| 7,833,641 B2 | 11/2010 | Tomiyasu et al. | |
| 7,862,914 B2 | 1/2011 | Kubota et al. | |
| 7,910,159 B2 | 3/2011 | Jung | |
| 7,911,736 B2 | 3/2011 | Bajorek | |
| 7,924,519 B2 | 4/2011 | Lambert | |
| 7,944,165 B1 | 5/2011 | O'Dell | |
| 7,944,643 B1 | 5/2011 | Jiang et al. | |
| 7,955,723 B2 | 6/2011 | Umezawa et al. | |
| 7,983,003 B2 | 7/2011 | Sonobe et al. | |
| 7,993,497 B2 | 8/2011 | Moroishi et al. | |
| 7,993,765 B2 | 8/2011 | Kim et al. | |
| 7,998,912 B2 | 8/2011 | Chen et al. | |
| 8,002,901 B1 | 8/2011 | Chen et al. | |
| 8,003,237 B2 | 8/2011 | Sonobe et al. | |
| 8,012,920 B2 | 9/2011 | Shimokawa | |
| 8,038,863 B2 | 10/2011 | Homola | |
| 8,057,926 B2 | 11/2011 | Ayama et al. | |
| 8,062,778 B2 | 11/2011 | Suzuki et al. | |
| 8,064,156 B1 | 11/2011 | Suzuki et al. | |
| 8,076,013 B2 | 12/2011 | Sonobe et al. | |
| 8,092,931 B2 | 1/2012 | Ishiyama et al. | |
| 8,100,685 B1 | 1/2012 | Harper et al. | |
| 8,101,054 B2 | 1/2012 | Chen et al. | |
| 8,125,723 B1 | 2/2012 | Nichols et al. | |
| 8,125,724 B1 | 2/2012 | Nichols et al. | |
| 8,137,517 B2 | 3/2012 | Bourez | |
| 8,142,916 B2 | 3/2012 | Umezawa et al. | |
| 8,163,093 B1 | 4/2012 | Chen et al. | |
| 8,171,949 B1 | 5/2012 | Lund et al. | |
| 8,173,282 B1 * | 5/2012 | Sun | G11B 5/65 |
| | | | 204/192.1 |
| 8,178,480 B2 | 5/2012 | Hamakubo et al. | |
| 8,206,789 B2 | 6/2012 | Suzuki | |

(56) References Cited

U.S. PATENT DOCUMENTS

| | | |
|---|---|---|
| 8,218,260 B2 | 7/2012 | Iamratanakul et al. |
| 8,241,766 B2 | 8/2012 | Lu et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,351,309 B2 | 1/2013 | Kanbe et al. |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B1 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 9,034,492 B1 * | 5/2015 | Mallary ............... G11B 5/64 427/127 |
| 2002/0060883 A1 | 5/2002 | Suzuki |
| 2003/0022024 A1 | 1/2003 | Wachenschwanz |
| 2003/0108721 A1 * | 6/2003 | Fullerton et al. ............ 428/195 |
| 2004/0022387 A1 | 2/2004 | Weikle |
| 2004/0107426 A1 | 6/2004 | Sato et al. |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0016836 A1 | 1/2005 | Kuo et al. |
| 2005/0036223 A1 | 2/2005 | Wachenschwanz et al. |
| 2005/0135010 A1 | 6/2005 | Liu et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0202287 A1 | 9/2005 | Lu et al. |
| 2005/0263401 A1 | 12/2005 | Olsen et al. |
| 2006/0093867 A1 | 5/2006 | Takenoiri et al. |
| 2006/0147758 A1 | 7/2006 | Jung et al. |
| 2006/0154110 A1 | 7/2006 | Hohlfeld et al. |
| 2006/0181697 A1 | 8/2006 | Treves et al. |
| 2006/0207890 A1 | 9/2006 | Staud |
| 2006/0222904 A1 | 10/2006 | Hsia et al. |
| 2007/0026263 A1 | 2/2007 | Kubota et al. |
| 2007/0070549 A1 | 3/2007 | Suzuki et al. |
| 2007/0245909 A1 | 10/2007 | Homola |
| 2007/0247756 A1 | 10/2007 | Lai et al. |
| 2007/0279791 A1 * | 12/2007 | Mallary ............... G11B 5/855 360/69 |
| 2008/0026255 A1 | 1/2008 | Das et al. |
| 2008/0075845 A1 | 3/2008 | Sonobe et al. |
| 2008/0093760 A1 | 4/2008 | Harper et al. |
| 2009/0040644 A1 | 2/2009 | Lu et al. |
| 2009/0117408 A1 | 5/2009 | Umezawa et al. |
| 2009/0136782 A1 | 5/2009 | Lu |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0055499 A1 * | 3/2010 | Harkness ............ C23C 14/024 428/800 |
| 2010/0143752 A1 | 6/2010 | Ishibashi et al. |
| 2010/0182714 A1 | 7/2010 | Kanbe et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0096432 A1 | 4/2011 | Lu et al. |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0277508 A1 | 11/2011 | Osawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |

(56) References Cited

U.S. PATENT DOCUMENTS

| | | |
|---|---|---|
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0194942 A1* | 8/2012 | Hohlfeld ............ G11B 5/3133 360/59 |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1* | 10/2012 | Yuan ................ G11B 5/8404 428/800 |
| 2012/0251845 A1* | 10/2012 | Wang ................ G11B 5/66 428/827 |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0004796 A1* | 1/2013 | Peng et al. ................ 428/827 |
| 2013/0034747 A1* | 2/2013 | Taniguchi ............ G11B 5/653 428/835.1 |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

OTHER PUBLICATIONS

Marshall, A.F., Y.S. Lee and D.A. Stevenson, "Crystallization Behavior of Amorphous Cu(48)Ti(52): Formation of an Intermediate Long-Period Superlattice Phase," Center for Material Research and Department of Materials Science, Stanford University, Stanford, California, Pergamon Journals Ltd., Aug. 1985, pp. 61-68.

Okamoto, "Cu—Ti (Copper-Titanium)," Journal of Phase Equilibria 26, 3 (2002) pp. 549-550.

Hua Yuan, et al., U.S. Appl. No. 13/077,160, filed Mar. 31, 2011, 22 pages.

Thornton, "Influence of apparatus geometry and deposition conditions on the structure and topography of thick sputtered coatings," J.Vac. Sci. Technol. 11, pp. 666-670 (1974).

\* cited by examiner

HAMR MEDIA STRUCTURE HAVING AN ANISOTROPIC THERMAL BARRIER LAYER

FIELD OF THE INVENTION

The present invention generally relates to magnetic recording media and, in particular, relates to HAMR media structure having an anisotropic thermal barrier layer.

BACKGROUND

Heat assisted magnetic recording (HAMR) is likely to enable the next wave of areal density growth in the hard disk drive (HDD) industry. The HAMR magnetic recording media differs from conventional magnetic recording media in that the HAMR media must be designed to achieve certain thermal and thermo-magnetic properties so that the electromagnetic energy received from a near field transducer (NFT) on the head can be used effectively in assisting writing sharp magnetic transitions at the high intended recording densities.

BRIEF SUMMARY OF THE INVENTION

In certain aspects, a heat assisted magnetic recording (HAMR) media structure is provided. The HAMR media structure can comprise a magnetic recording layer comprising an array of magnetic grains for storing information. The HAMR media structure can further comprise a heat sink layer disposed below the magnetic recording layer and having a first thermal conductivity. The HAMR media structure can further comprise an anisotropic thermal barrier layer disposed between the magnetic recording layer and the heat sink layer and having a vertical thermal conductivity and an in-plane thermal conductivity, wherein the vertical thermal conductivity is substantially higher than the in-plane thermal conductivity.

In certain aspects, the anisotropic thermal barrier layer can comprise an array of columnar grains having a second thermal conductivity that is equal or less than the first thermal conductivity and an insulating boundary separating two adjacent columnar grains and having a third thermal conductivity that is lower than the second thermal conductivity.

DETAILED DESCRIPTION

Figure 1:
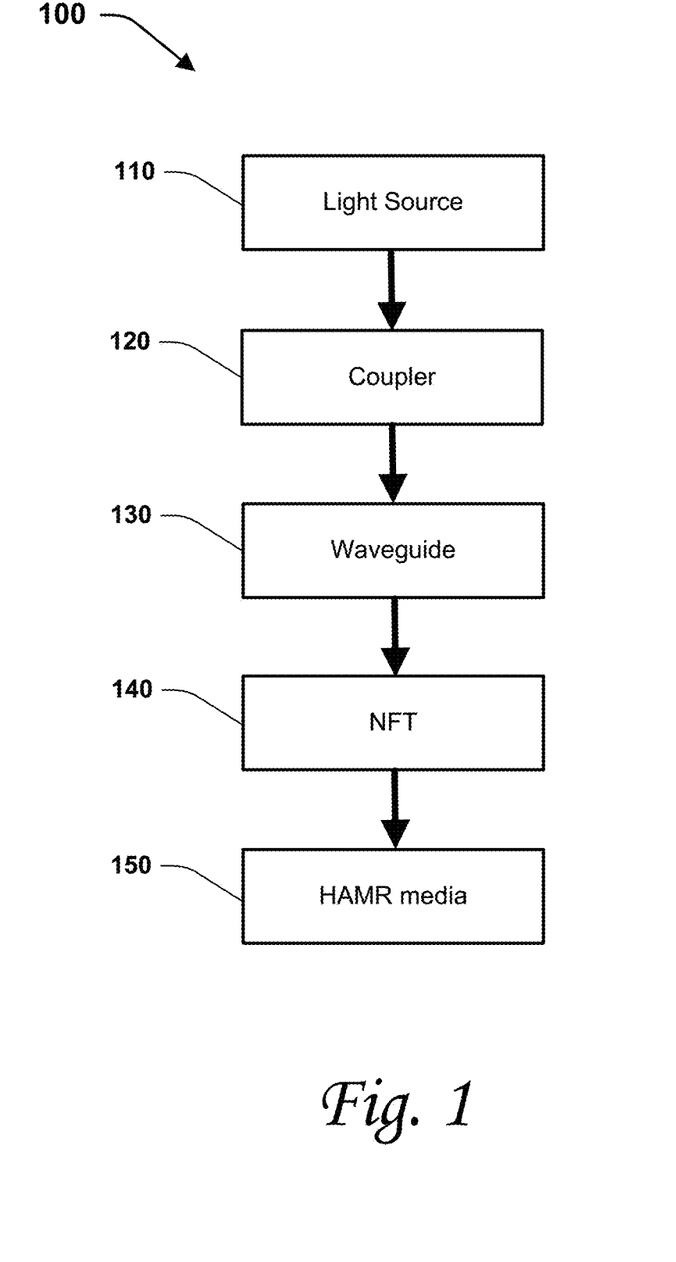
FIG. 1 is a functional block diagram illustrating a heat assisted magnetic recording (HAMR) system.

FIG. 1 is a functional block diagram illustrating a heat assisted magnetic recording (HAMR) system 100. In the illustrated example, light energy generated by a light source 110 (e.g., laser diode) is coupled to a waveguide 130 via a coupler 120. The coupler 120 can be a grating or simple butt coupling. Some of the light energy is lost in the coupler 120 due to scattering. The waveguide 130 guides and directs the light energy to a near field transducer (NFT) 140. While in the waveguide 130, some of the light energy is lost by scattering in the waveguide due to process imperfections and also to the surrounding pole as pole absorption. The NFT 140 focuses the light energy received from the waveguide 130 into a nano-sized light beam and delivers the beam to HAMR media 150 so as to heat up a specific recording region in the media. Some of the light energy received by the NFT 140 is also lost due to absorption by the NFT.

One significant problem in HAMR recording is a low NFT delivery efficiency—defined as the percentage ratio of the light energy delivered to the HAMR media 150 from the NFT divided by the light energy received by the NFT. The NFT delivery efficiency is typically less than 15% in practical HAMR systems. One factor contributing to the low efficiency is the fact that the intended thermal spot size on the HAMR media is much smaller than the wavelength of the light from the laser source. This means that a good deal of energy is dissipated in the head itself and particularly, at the near field transducer (NFT).

Because the NFT delivery efficiency is low, power requirement for the light source 110 is quite high. For example, heat dissipation by a laser diode needs special care with consideration of the 30–40% of lasering efficiency and the light absorption by the adjacent magnetic elements due to the interaction of scattering light from waveguide resultant from taper, bend and process imperfections. Furthermore, besides the portion of energy delivered to the HAMR media 150, the absorption by the NFT 140 itself together with the pole absorption can heat up the NFT 140 to a very high temperature at which the NFT 140 can melt, deform or recrystallize and lose its function.

From a recording capability point of view, a higher thermal gradient (typically measured in Kelvin per nanometer, K/nm) in the HAMR recording media is preferred as it translates into sharper transitions resulting in lower media noise (lower transition jitter) and higher linear density capability. One way to increase the thermal gradient is to increase the heat-sinking properties of the HAMR media 150 to remove or dissipate the thermal energy as fast as possible. However, since a minimum peak temperature on the HAMR media 150 is a requirement (typically it must exceed the Curie point of the magnetic alloy used in the magnetic recording layer), the laser power also need to be increased. A higher laser power in turn increases the power dissipation in the head including at the NFT 140 and reduces the reliability of the HAMR system 100.

In this regard, a HAMR media structure with heat dissipation characteristics that achieves a sizable reduction in the power requirement for the light source 110 while maintaining an equivalent thermal spot size on the recording media 150 can significantly improve the reliability of the HAMR system 100 as a whole.

Figure 2:
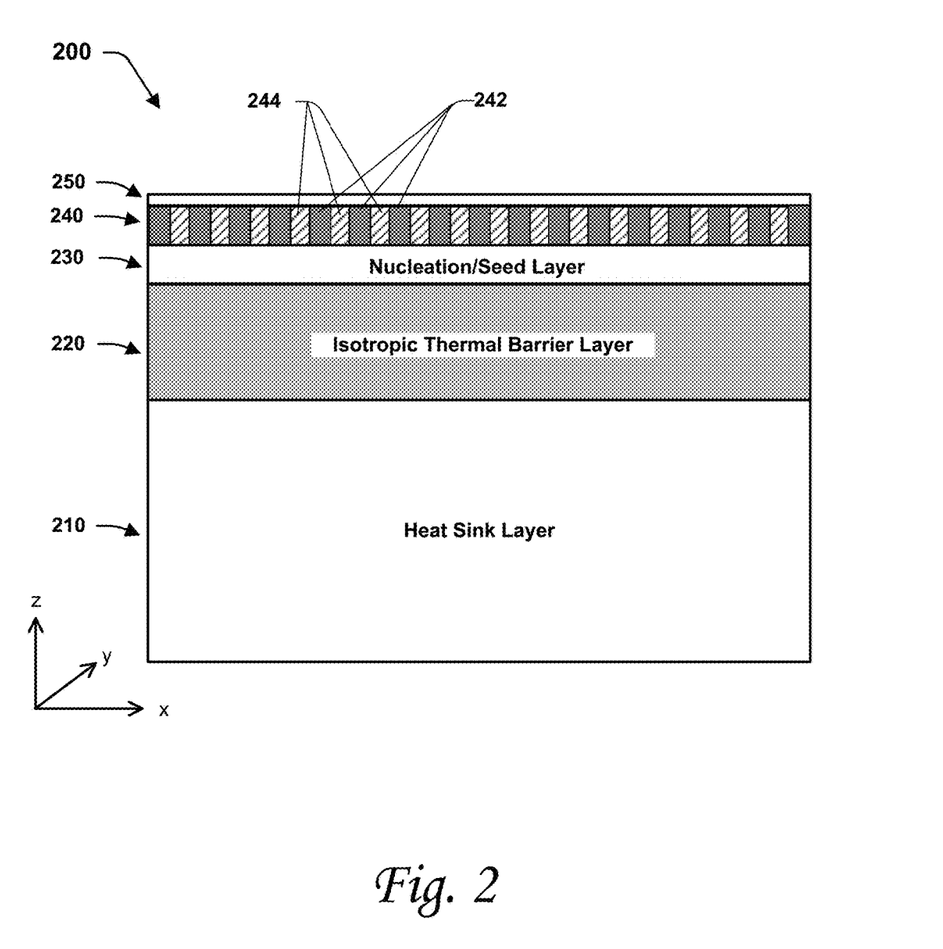
FIG. 2 is a diagram depicting a cross-sectional view of a conventional HAMR media structure.

FIG. 2 is a diagram depicting a cross-sectional view of a typical HAMR media structure 200. The HAMR media structure 200 includes a heat link layer 210, a thermal barrier layer 220 disposed over the heat sink layer 210, a nucleation and/or seed (nucleation/seed) layer 230 disposed over the thermal barrier layer 220, a magnetic recording layer 240 disposed over the nucleation/seed layer 230, and a protective coat 250 over the magnetic recording layer 240. The magnetic recording layer 240 includes an array of magnetic grains 242 for recording information and segregants 244 for providing magnetic separations between adjacent magnetic grains 242. In certain embodiments, the magnetic recording layer 240 has a thickness between about 5 and 15 nm. The magnetic grain 242 comprises a soft magnetic material, non-limiting examples of which are FePt, Mn$_3$Al, FePd, CoPt, CoPd, CoPtIr, FePtIr, FePtRh, CoRhPt, FePdRh, FePtNi, CoPtNi, FePtCu, or a combination thereof. The segregant 244 comprises a non-magnetic material, non-limiting examples of which are silicon oxide, tantalum oxide, magnesium oxide, silver, carbon, titanium oxide, or a combination thereof. Magnetic recording layers having such magnetic grains and segregants and various methods of producing the same are known in the art.

The protective overcoat 250 (e.g., carbon overcoat) provides a protection for the magnetic recording layer 240. The nucleation/seed layer 230 promotes a growth of the magnetic grains 242 and also creates a desired magnetic orientation for the grains. The nucleation/seed layer 230 comprises MgO, SiC, TiN, TiC, NiAl, RuAl, or a combination thereof. In certain embodiments, the nucleation layer has a thickness between about 2 and 10 nm.

The heat sink layer 210 is responsible for dissipating or removing the light-generated heat from the magnetic recording layer 240. For fast and efficient heat dissipation, the heat sink layer 210 is typically made of a material (e.g., a metal) having a high thermal conductivity (typically greater than 40 $W \cdot m^{-1} \cdot K^{-1}$). Non-limiting examples include copper, silver, ruthenium, nickel, aluminum, tungsten, gold, or a combination thereof. In certain embodiments, the heat sink layer 210 has a thickness between about 20 and 200 nm.

The thermal barrier layer 220 is provided between the magnetic recording layer 240 and the heat sink layer 210 to control the heat management characteristics (e.g., magnitude and rate of heat containment and/or dissipation, thermal gradients). The thermal barrier layer 220 is made of a material having a thermal conductivity (typically about 10 $W \cdot m^{-1} \cdot K^{-1}$) that is substantially lower than that of the heat sink layer 210. In the HAMR media structure shown in FIG. 2, the thermal barrier layer 220 is thermally isotropic in the sense that its in-plane or lateral (e.g., in the x-y plane) thermal conductivity is substantially the same (e.g., within +/−5%) as its out-of-plane or vertical (e.g., in the z direction) thermal conductivity. As such, heat generated in the magnetic recording layer 340 flows equally well along the lateral direction as along the vertical direction.

According to certain aspects of the subject disclosure, a HAMR media structure having an anisotropic thermal barrier layer is proposed for superior heat management characteristics. In some embodiments, such an anisotropic thermal barrier is achieved using a columnar array of grains made of essentially the same material as used in the isotropic thermal barrier layer 220 with a thermally insulating boundary separating each grain from its adjacent grain. The composite arrangement reduces the effective in-plane thermal conductivity. In this manner, the vertical thermal conductivity would be comparable to that of the conventional isotropic thermal barrier layer but the in-plane conductivity is made substantially less.

Figure 3:
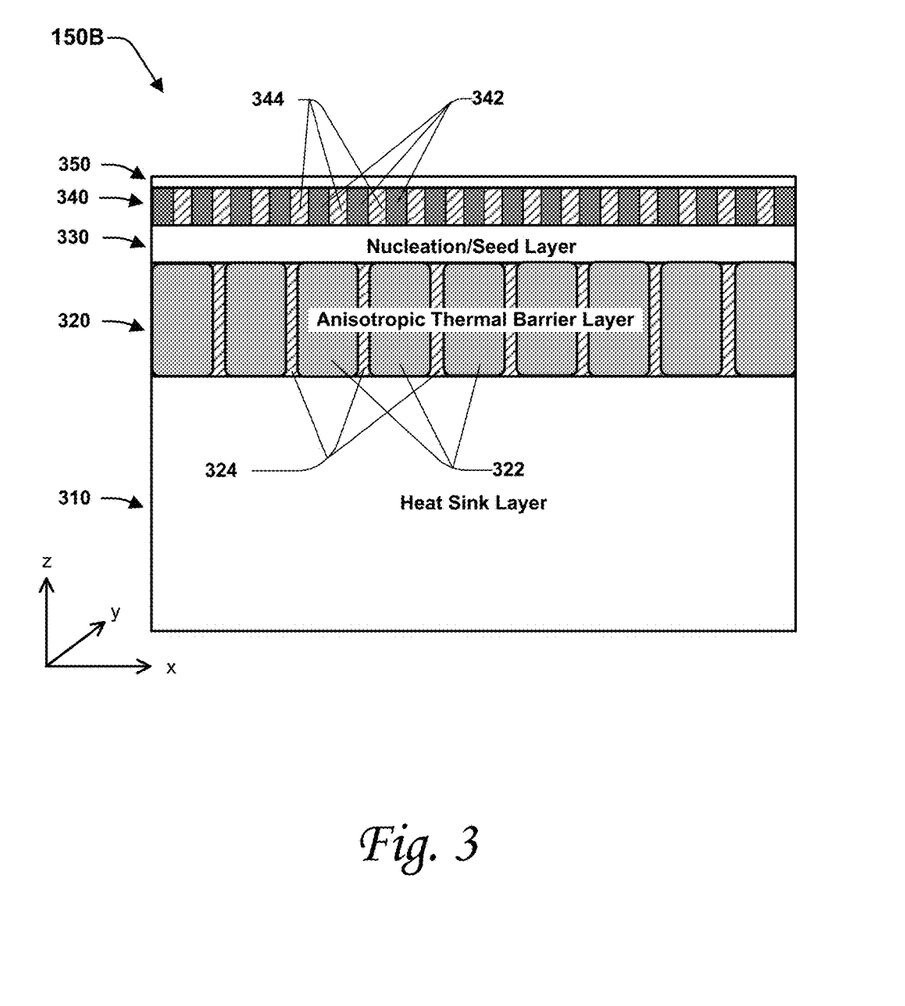
FIG. 3 is a diagram depicting a cross-sectional view of an exemplary HAMR media structure having an anisotropic thermal barrier layer according to certain aspects of the subject disclosure.

FIG. 3 is a diagram depicting a cross-sectional view of an exemplary HAMR media structure 300 having an anisotropic thermal barrier layer according to certain aspects of the subject disclosure. The HAMR media structure 300 includes a heat sink layer 310, an anisotropic thermal barrier layer 320 disposed over the heat sink layer 310, a nucleation/seed layer 330 disposed over the anisotropic thermal barrier layer 320, a magnetic recording layer 340 disposed over the nucleation/seed layer 330, and a protective coat 350 disposed over the magnetic recording layer 340. As with the magnetic recording layer 240 in the HAMR media structure 200 of FIG. 2, the magnetic recording layer 340 includes an array of magnetic grains 342 where adjacent grains 342 are separated by segregants 344. Respective functions of and exemplary materials for the heat sink layer 310, the nucleation/seed layer 330, the magnetic recording layer 340, and the protective coat 350 are substantially the same as the corresponding layers in the HAMR media structure 200 of FIG. 2 and are not repeated here for the sake of brevity.

In certain embodiments, the anisotropic thermal barrier layer 320 has a thickness between about 5 and 50 nm. Unlike the isotropic thermal barrier layer 220 of FIG. 2, the vertical thermal conductivity of the anisotropic thermal barrier layer 320, is substantially (e.g., at least 10%) greater than the in-plane thermal conductivity. In certain embodiments, the ratio of the vertical thermal conductivity to the in-plane thermal conductivity is greater than 3. In other embodiments, the ratio is greater than 10.

In some exemplary embodiments, the thermal barrier layer 320 is a composite of two different materials. For example, in the illustrated example of FIG. 3, the anisotropic thermal barrier layer 320 comprises an array of columnar grains 322 and insulating boundaries 324. Each insulating boundary 324 separates two adjacent columnar grains 322. The columnar grain 322 has a thermal conductivity that is equal to or less than the thermal conductivity of the heat sink layer 310. In certain embodiments, the thermal conductivity of the columnar grain 322 is between about 5 and 70 $W \cdot m^{-1} \cdot K^{-1}$. In some embodiments, the thermal conductivity of the columnar grain 322 is between about 5 and 20 $W \cdot m^{-1} \cdot K^{-1}$. In certain embodiments, the columnar grain 322 comprises Co, Fe, B, Zr, Cr, Ta, Mo or a combination thereof. In some embodiments, each columnar grain 322 has a diameter in the range of between about 5 and 30 nm.

The insulating boundary 324 has a thermal conductivity that is lower than the thermal conductivity of the columnar grain 322. In certain embodiments, the insulating boundary 324 comprises SiO$_2$, TiO$_2$, MgO, TiC, TiN, Ta$_3$O$_5$, CoO, C, B, or a combination thereof. In certain embodiments, the thermal conductivity of the insulating boundary 324 is between about 0.1 and 20 $W \cdot m^{-1} \cdot K^{-1}$ and, in some embodiments, between about 0.1 and 5 $W \cdot m^{-1} \cdot K^{-1}$. In certain embodiments, each insulating boundary 324 has a width in the range of between about 0.5 and 3 nm.

Various methods of growing a composite thin-film structure having an array of columnar grains and insulating boundaries such as the thermal barrier layer 320 shown in FIG. 3 are known in the art. One method is disclosed, for example, in J. A. Thornton, J. Vac. Sci. Technol. 11, 666 (1974). Columnar grain growth morphologies in thin-film are typically achieved by growing material systems where one constituent is immiscible or has low solubility in the other. For instance, metallic systems co-sputtered with oxide phases typically result in columnar grains of metallic core, separated by grain boundaries containing the oxide phase.

The deposition conditions of substrate temperature and pressure for promoting columnar growth depend on materials properties and materials systems. For single materials, a Thornton diagram disclosed in the above-identified article by J. A. Thornton provides a good direction on how to obtain columnar structures but, again, for systems where an impurity or a second phase segregates as the film grows, a columnar structure is a common outcome of such growth. These materials are most commonly grown by DC sputtering methods although other deposition methods such as RF sputtering and evaporation may be used.

In some exemplary embodiments, the anisotropic thermal barrier layer 320 may be realized using a single material having an intrinsic thermal anisotropy. Materials such as graphite, WSe (tungsten selenide) or various Micas compounds such as MoS2, WS2 and WSe2 are highly and naturally highly anisotropic in terms of their thermal conductivities along main symmetry axes of the crystal structures. For instance, graphite, in the plane of the sheet atoms are bonded through strong chemical bonds while in between sheets, the bonding is mostly electrostatic in nature and much weaker than the atomic bonds within the sheets. Graphite has a layered, planar structure. In each layer, the carbon atoms are arranged in a honeycomb lattice with separation of 0.142 nm, and the distance between planes is 0.335 nm. The acoustic and thermal properties of graphite are highly anisotropic, since phonons propagate very quickly along the tightly-bound planes, but are slower to travel from one plane to another.

A thermomagnetic modeling was performed to verify and quantify (i.e., estimate) the benefits of a HAMR structure having an anisotropic thermal barrier layer over a HAMR media structure having an isotropic thermal barrier layer. Various physical parameters used for the modeling are shown in Table 1 below:

TABLE 1

| | Thickness (nm) | In-Plane Thermal Conductivity $(W \cdot m^{-1} \cdot K^{-1})$ | Out-of-Plane Thermal Conductivity $(W \cdot m^{-1} \cdot K^{-1})$ |
|---|---|---|---|
| Magnetic recording layer (FePt + SiO2) | 10 | 1 | 5.7 |
| Isotropic thermal barrier layer | 35 | 10.5 | 10.5 |
| Anisotropic thermal barrier layer | 35 | 1 | 10.5 |
| Heat sink layer (Ru) | 200 | 70 | 70 |
| Substrate (Glass) | Infinite ($>10^5$) | 1.1 | 1.1 |

Figure 4:
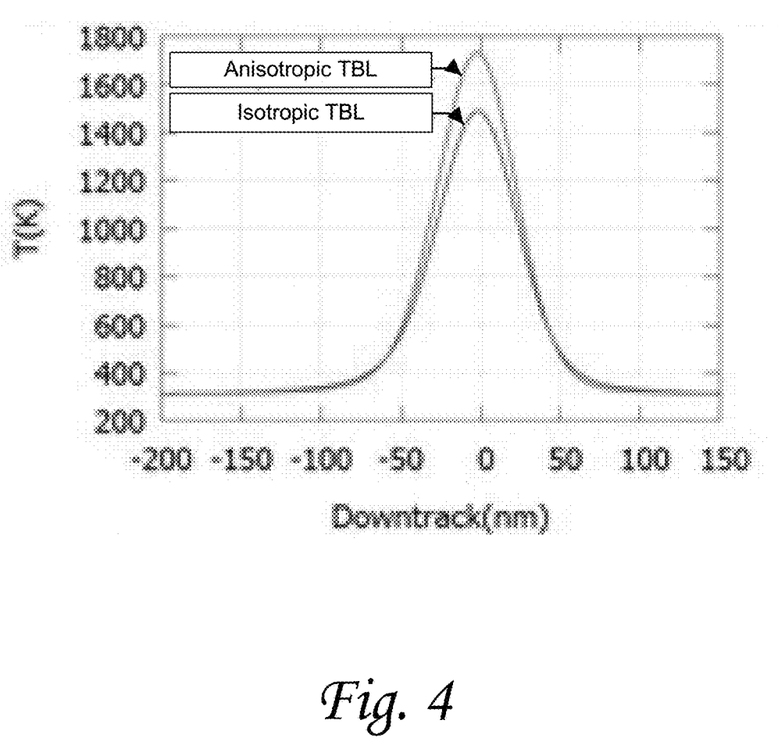
FIG. 4 compares temperatures as a function of downtrack distance.
Figure 5:
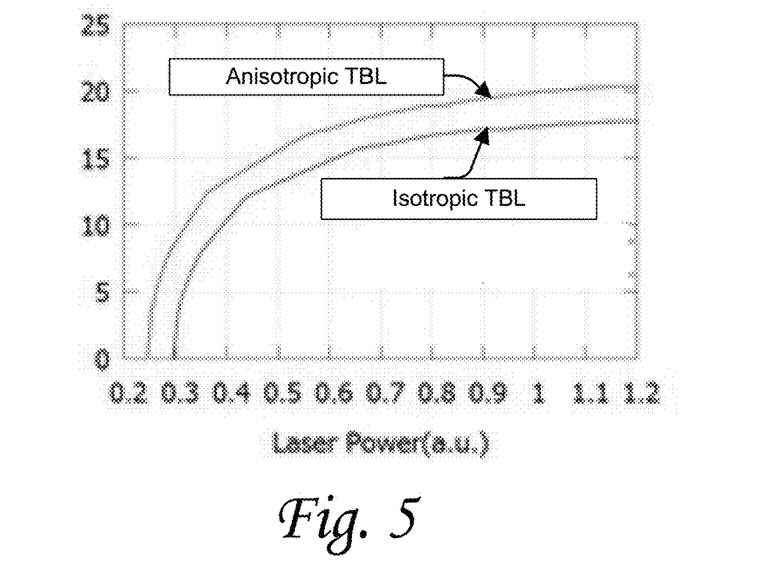
FIG. 5 compares thermal gradients (dT/dX) at different levels of laser power.
Figure 6:
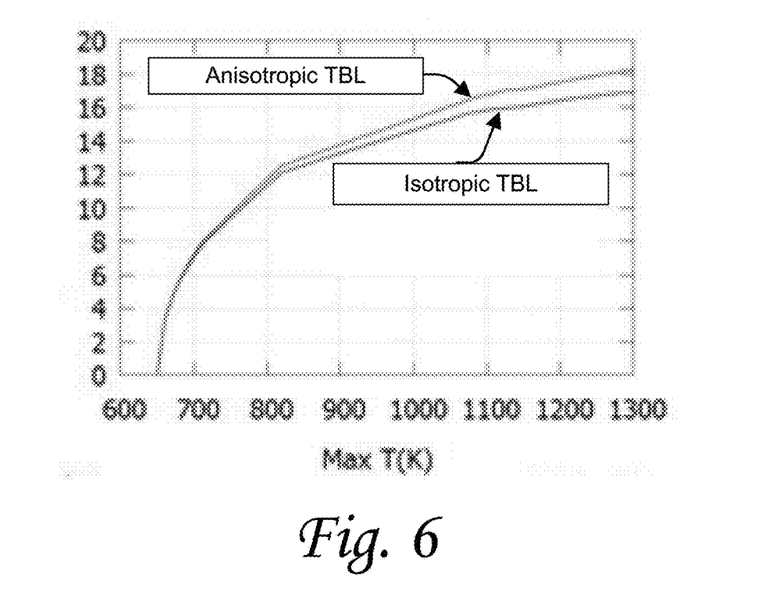
FIG. 6 compares thermal gradients for the peak temperature range of interest (750-850K).

FIGS. 4-6 provide comparisons of various thermal properties associated with the isotropic and anisotropic thermal barrier layers. FIG. 4 compares temperatures as a function of downtrack distance at the same level of laser power. Due to a lower effective thermal conductivity, the temperature profile for the anisotropic thermal barrier layer is higher than that for the isotropic thermal barrier layer. FIG. 5 compares thermal gradients (dT/dX) at different levels of laser power. At all laser power levels, the thermal gradient is higher for the anisotropic thermal barrier layer than for the isotropic thermal barrier layer. FIG. 6 compares thermal gradients for the peak temperature range of interest (750-850K). This comparison shows that the thermal gradient is not significantly affected by the use of an anisotropic thermal barrier layer compared to an isotropic one at the same peak temperature. This observation leads to the conclusion that a less laser power is needed for the anisotropic thermal barrier layer to reach the same peak temperature and the same thermal gradient, the two key HAMR parameters of interest. The magnitude of the laser power reduction in our modeling was of ~16-21%. A higher reduction can be achieved by the use of materials with more optimized thermal conductivity values and layer structure designs.

Accordingly, a HAMR media structure with an anisotropic thermal barrier layer can achieve a reduction in the power requirement for the light source while maintaining an equivalent thermal spot size on the recording media. A reduction in laser power requirement, in turn, can significantly improve the reliability of the HAMR system as a whole.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

We claim:

1. A heat assisted magnetic recording (HAMR) media structure comprising:
   a magnetic recording layer comprising an array of magnetic grains for storing information;
   a heat sink layer disposed below the magnetic recording layer and having a first thermal conductivity;
   an anisotropic thermal barrier layer disposed between the magnetic recording layer and the heat sink layer and having a vertical thermal conductivity and an in-plane thermal conductivity,
     wherein the anisotropic thermal barrier layer consists of a single material selected from the group consisting of graphite and mica compounds and the ratio of the vertical thermal conductivity to the in-plane thermal conductivity is greater than 3; and
   a nucleation layer disposed between the magnetic recording layer and the anisotropic thermal barrier layer, wherein the nucleation layer is selected from the group consisting of SiC, TiN, TiC and RuAl.

2. The HAMR media structure of claim 1, wherein the magnetic recording layer has a thickness between about 5 and 15 nm.

3. The HAMR media structure of claim 1, wherein the magnetic grains comprises a soft magnetic material selected from the group consisting of FePt, Mn$_3$Al, FePd, CoPt, CoPd, CoPtIr, FePtIr, FePtRh, CoRhPt, FePdRh, FePtNi, CoPtNi, and FePtCu.

4. The HAMR media structure of claim 1, wherein each of the magnetic grains is separated from an adjacent magnetic grain by a segregant.

5. The HAMR media structure of claim 4, wherein the segregant comprises silicon oxide, tantalum oxide, magnesium oxide, silver, carbon, titanium oxide, or a combination thereof.

6. The HAMR media structure of claim 1, wherein the nucleation layer has a thickness between about 2 and 10 nm.

7. The HAMR media structure of claim 1, wherein the heat sink layer has a thickness between about 20 and 200 nm.

8. The HAMR media structure of claim 1, wherein the heat sink layer comprises copper, silver, ruthenium, nickel, aluminum, tungsten, gold, or a combination thereof.

9. The HAMR media structure of claim 1, wherein the first thermal conductivity is higher than 40 $W \cdot m^{-1} \cdot K^{-1}$.

10. The HAMR media structure of claim 1, wherein the anisotropic thermal barrier layer has a thickness between about 5 and 50 nm.

11. The HAMR media structure of claim 1, wherein the ratio of the vertical thermal conductivity to the in-plane thermal conductivity is greater than 10.

12. The HAMR media structure of claim 1, wherein the anisotropic thermal barrier layer has a thickness between about 35 and 50 nm.

* * * * *